R. J. RUSSEL.
CASTER.
APPLICATION FILED NOV. 5, 1910.

985,455.

Patented Feb. 28, 1911.

WITNESSES
Orville Cook
Irv. L. McCathraw

Robert J. Russel
INVENTOR

By E. E. Chrisman,
Attorney.

UNITED STATES PATENT OFFICE.

ROBERT J. RUSSEL, OF FLINT, MICHIGAN.

CASTER.

985,455.

Specification of Letters Patent. Patented Feb. 28, 1911.

Application filed November 5, 1910. Serial No. 590,884.

*To all whom it may concern:*

Be it known that I, ROBERT J. RUSSEL, a subject of the King of Great Britain, residing at Flint, in the county of Genesee and State of Michigan, have invented certain new and useful Improvements in Casters, of which the following is a specification, reference being had therein to the accompanying drawing.

This invention relates to casters and has for its object the production of a ball-bearing caster which will prevent the jamming of the balls contained therein.

Another object of this invention is the production of a caster which is simple in construction, efficient in operation and consists of a comparatively small number of parts.

With these and other objects in view this invention consists of certain novel constructions, combinations and arrangements of parts as will be hereinafter fully described and claimed.

Figure 1:
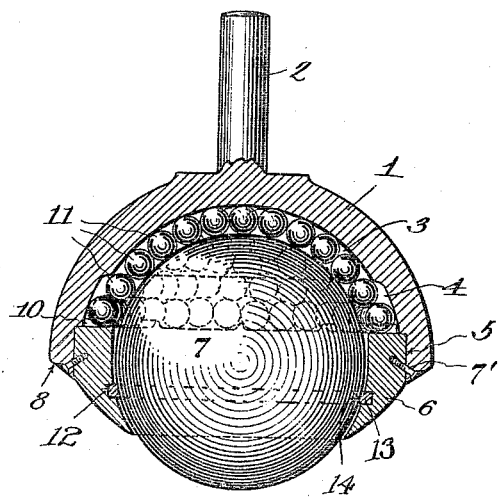
Figure 2:
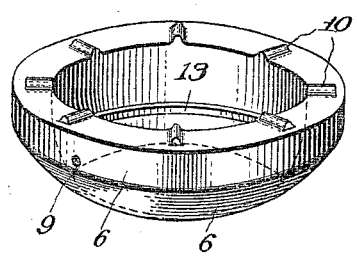

In the drawings: Figure 1 is a vertical sectional view of the caster. Fig. 2 is a perspective view of the ring or washer adapted to hold the caster ball in place.

Referring to the drawings by numerals 1 designates the body which is provided with the usual shank 2 for holding the caster in place. The body 1 is provided upon its under surface with a socket 3 formed on the arc of a circle and a counterbore 4 of greater diameter than said socket formed near its lower edge. A seat 5 is formed adjacent the outer end of the socket 3 and receives the washer 6 which holds the caster ball 7 in place. The washer 6 is held in the socket 5 by means of rivets or screws 7 which pass through the lower beveled edge 8 of the body 1 and enter the apertures 9 in the side of the washer. The inner surface of the washer is shaped to conform to the shape of the caster ball.

The washer 6 is provided upon its upper surface with a plurality of upwardly extending ribs 10 which extend across the upper end of the washer 6 from the inner face thereof but terminate short of the outer face. These ribs 10 are placed at intervals upon the upper face of the washer and assist the circulation of the ball bearings within the caster as will be more fully pointed out.

The ball bearings 11 are interposed between the caster ball 7 and the inner face of the body 1 and as the caster ball revolves the ball bearings will in turn revolve and a complete circulation of balls will take place. The additional space allowed by the counterbore 4 will prevent any jamming of the balls as the same ride over the ribs 10 of the washer, and since the ribs 10 assist the balls in rising there will be a continuous movement of balls over the caster-ball 7. When the washer 6 is in place within the seat 5 the outer ends of the rib 10 will of course abut against the inner wall of the counterbore 4.

A great inconvenience has been experienced in the past in ball-bearing casters due to the jamming of the balls and with this device this difficulty may be overcome for the reason that the bearings will have a continuous flow over the caster ball.

The washer 6 is provided upon its inner side with an annular groove 12 formed intermediate its ends and a gasket 13 is seated within the groove 12, and has its outer face 14 engaging the caster ball 7 so as to prevent the dust or dirt which is likely to collect around the caster from entering the inner portion of the same. It will be obvious that the gasket 13, which can be made of felt or any other suitable material, will seal the caster since the outer face of the gasket 13 will at all times rub against the caster ball.

Having described the invention, what I claim is:

1. A ball-bearing caster comprising a body provided with a socket formed in the under surface thereof, a caster-ball positioned within said socket, ball-bearings formed in said socket, a washer carried by said body for holding the caster-ball in place, and ribs formed upon the upper edge of said washer for assisting in the rise of said balls.

2. A ball bearing caster comprising a hollow body, a seat formed near the edge of said body and receiving a washer, a caster-ball positioned within said hollow body and held in place by said washer, said body provided with a counterbore formed above said seat, ball-bearings interposed between said caster-ball and the inner surface of said body, ribs formed upon the upper end of said washer and extending transversely thereof, and the upper end of said washer acting as a track for the lower ball bearings within said caster.

In testimony whereof I hereunto affix my signature in presence of two witnesses.

ROBERT J. RUSSEL.

Witnesses:
    JOHN H. TYLER,
    PETER CRIST.

Copies of this patent may be obtained for five cents each, by addressing the "Commissioner of Patents, Washington, D. C."